(12) United States Patent
Whelan et al.

(10) Patent No.: US 8,983,154 B2
(45) Date of Patent: Mar. 17, 2015

(54) METHOD FOR IDENTIFYING COLON POLYPS IN A COMPUTED TOMOGRAPHY COLONOGRAPHY DATASET

(75) Inventors: Paul Francis Whelan, Dublin (IE); Kevin Peter Robinson, Dublin (IE); Nicolas Sezille, Dublin (IE)

(73) Assignee: Dublin City University, Dublin (IE)

( * ) Notice: Subject to any disclaimer, the term of this patent is extended or adjusted under 35 U.S.C. 154(b) by 960 days.

(21) Appl. No.: 12/745,354

(22) PCT Filed: Nov. 28, 2008

(86) PCT No.: PCT/EP2008/066482
§ 371 (c)(1),
(2), (4) Date: Jul. 20, 2010

(87) PCT Pub. No.: WO2009/068679
PCT Pub. Date: Jun. 4, 2009

(65) Prior Publication Data
US 2010/0303322 A1 Dec. 2, 2010

Related U.S. Application Data

(60) Provisional application No. 60/990,725, filed on Nov. 28, 2007.

(30) Foreign Application Priority Data

Nov. 28, 2007 (EP) .................................... 07121814

(51) Int. Cl.
*G06K 9/00* (2006.01)
*G06T 7/00* (2006.01)
*G06T 7/40* (2006.01)

(52) U.S. Cl.
CPC ............ *G06T 7/0012* (2013.01); *G06T 7/0083* (2013.01); *G06T 7/0089* (2013.01); *G06T 7/402* (2013.01); *G06T 2207/10081* (2013.01); *G06T 2207/20061* (2013.01); *G06T 2207/20116* (2013.01); *G06T 2207/20136* (2013.01);
(Continued)

(58) Field of Classification Search
CPC ........................................................ G06K 9/00
See application file for complete search history.

(56) References Cited

U.S. PATENT DOCUMENTS 6,609,021 B1    8/2003  Fan et al. ...................... 600/425
6,947,784 B2 *  9/2005  Zalis ............................ 600/425
(Continued)

OTHER PUBLICATIONS

Konukoglu et al., Polyp Enhancing Level Set Evolution of Colon Wall: Method and Pilot Study, IEEE Transactions on Medical Imaging, pp. 1649-1656, Dec. 2007.*
(Continued)

*Primary Examiner* — Michael Fuelling
(74) *Attorney, Agent, or Firm* — Kusner & Jaffe

(57) ABSTRACT

A method of formatting data for identifying colon polyps in a Computed Tomography Colonography (CTC) dataset comprising the steps of: extracting colon surface data, from the CTC dataset, within a sub-volume centered on a candidate polyp (CP) seed point; identifying individual sets of points corresponding to the CP's body and CP's base within the sub-volume; selecting the points corresponding to the body; re-formatting the candidate polyp by projecting the selected points corresponding to the body on to a tangent plane; and generating a series of cutting planes based on the reformatted candidate polyp.

15 Claims, 5 Drawing Sheets

(52) U.S. Cl.
CPC ............... *G06T2207/20156* (2013.01); *G06T 2207/30032* (2013.01)
USPC .......................................... 382/128; 382/131

(56) References Cited

U.S. PATENT DOCUMENTS

| | | | |
|---|---|---|---|
| 7,272,251 B2* | 9/2007 | Acar et al. | 382/128 |
| 7,333,644 B2* | 2/2008 | Jerebko et al. | 382/128 |
| 7,379,572 B2* | 5/2008 | Yoshida et al. | 382/128 |
| 8,184,888 B2* | 5/2012 | Lu et al. | 382/131 |
| 8,687,898 B2 | 4/2014 | Prokhorov et al. | 382/224 |
| 2003/0223627 A1* | 12/2003 | Yoshida et al. | 382/128 |
| 2004/0141638 A1* | 7/2004 | Acar et al. | 382/131 |
| 2004/0228529 A1* | 11/2004 | Jerebko et al. | 382/173 |

OTHER PUBLICATIONS

International Search Report for International Application No. PCT/EP2008/066482, Oct. 3, 2009.

Acar et al., "Edge Displacement Field-Based Classification for Improved Detection of Polyps in CT Colonography," IEEE Transactions on Medical Imaging, vol. 21, No. 12, Dec. 2002, pp. 1461-1467.

Göktürk et al., "A Statistical 3-D Pattern Processing Method for Computer-Aided Detection of Polyps in CT Colonography," IEEE Transactions on Medical Imaging, vol. 20, No. 12, Dec. 2001, pp. 1251-1260.

Kiss et al., "Computer-aided diagnosis in virtual colonography via combination of surface normal and sphere fitting methods," Gastrointestinal, Departments of Medicine and Engineering, Medical Image Computing (Radiology—ESAT/PSI), University Hospital Gasthuisberg, Herestraat 49, 3000 Leuven, Belgium, Eur Radiol. (2002) 12:77-81, Published Online Jul. 12, 2001.

Paik et al., "Surface Normal Overlap: A Computer-Aided Detection Algorithm With Application to Colonic Polyps and Lung Nodules in Helical CT," IEEE Transactions on Medical Imaging, vol. 23, No. 6, Jun. 2004, pp. 661-675.

Summers et al., "Automated Polyp Detection at CT Colonography: Feasibility Assessment in a Human Population," Computer Applications, Radiology Apr. 2001, vol. 219, No. 1, pp. 51-59.

Yoshida et al., "Three-Dimensional Computer-Aided Diagnosis Scheme for Detection of Colonic Polyps," IEEE Transactions on Medical Imaging, vol. 20, No. 12, Dec. 2001, pp. 1261-1274.

Chowdhury et al., "A statistical approach for robust polyp detection in CT colonography," Proceedings of the 2005 IEEE Engineering in Medicine and Biology $27^{th}$ Annual Conference, Shanghai, China Sep. 1-4, 2005, pp. 2523-2526.

Dijkers et al., "Segmentation and Size Measurement of Polyps in CT Colonography," J. Duncan and G. Gerig (Eds.): MICCAI 2005, LNCS 3749, 2005, pp. 712-719.

Yoshida et al., "Computer-aided Diagnosis Scheme for Detection of Polyps at CT Colonography," Imaging & Therapeutic Technology, RadioGraphics 2002; vol. 22, No. 4 pp. 963-979.

Richards, "Remote Sensing Digital Image Analysis," An Introduction, Fifth Edition, Springer, p. 441, Sep. 2012.

King et al., "Neural Information Processing," $13^{th}$ International Conference, ICONIP 2006, Hong Kong, China, Oct. 2006, Proceedings, Part 1, Springer, pp. 709-710.

Hachey et al., "Selective Sampling for Information Extraction with a Committee of Classifiers," Conference Proceeding of PASCAL Challenge Workshop on Evaluating Machine Learning for Information Extraction, Southhampton, UK, Apr. 2005.

\* cited by examiner

METHOD FOR IDENTIFYING COLON POLYPS IN A COMPUTED TOMOGRAPHY COLONOGRAPHY DATASET

RELATED APPLICATIONS

This application is a U.S. National Stage of International Application No. PCT/EP08/66482, filed Nov. 28, 2008, which claims benefit of U.S. Provisional Application No. 60/990,725, filed Nov. 28, 2007 and European Patent Application No. 07121814.3, filed Nov. 28, 2007.

FIELD OF THE INVENTION

The present invention relates to the analysis of digital images. In particular, the invention is directed towards a method of computer aided detection of colon polyps in Computed Tomography Colonography scans.

BACKGROUND TO THE INVENTION

Polyps are abnormal growths of tissue projecting from a mucous membrane, and are commonly found in the colon, stomach, nose, bladder and uterus. Polyps can be flat, pedunculated, i.e. mushroom shaped, or sessile. Colon polyps, in particular, are a concern as benign colon polyps have the potential to transform with time into colon cancer. It is thought that flat polyps, or flat lesions, may lead to more aggressive cancer and may progress to cancers more rapidly than is typically the case with pedunculated or sessile polyps.

Computed Tomography Colonography (CTC), or Virtual Colonoscopy (VC), has become a particularly popular method in the identification of pre-cancerous polyps on the colon wall. The screening technique is non-invasive and is based on a high resolution 3-D X-ray scan of the subject's abdomen. In 2001, the feasibility of automated polyp detection in CTC was discussed by Summers et al. (*Radiology* 219, 51-59).

In order to improve the efficiency and accuracy associated with locating pre-cancerous polyps in a CTC scan, various Computer Aided Detection/Computer Assisted Diagnosis (CAD) techniques have been developed to assist the examining radiologist in assessing the results of a CTC data scan. CAD-CTC systems aim to provide the radiologist with locations for potential regions of particular interest within the very large datasets generated by CTC. This is essentially an assisted tool for radiologists who, upon examining the data provided by the method, can make an informed decision as to whether to return to a specific region in the dataset and examine the point of a potential polyp. To date, the focus of such CTC-CAD systems has been in the detection of raised (pedunculated and sessile) polyps protruding significantly from the colonic surface.

Some of the representative CTC-CAD polyp detection algorithms are disclosed below. Görtürk and co-workers (*IEEE Transactions on Medical Imaging* 2001, 20(12), 1251-1260) describe a statistical approach utilising training data and support vector machines to distinguish the differentiating characteristics of polyps and healthy tissue and make classifications based on this data. Yoshida and Nappi (*IEEE Transactions on Medical Imaging* 2001, 20(12), 1261-1274) employ hysteresis thresholding to isolated candidate polyps based on standard 3D geometric features. The candidates are further subjected to fuzzy clustering and discriminant analysis to reduce the number of false positives. The efficiency of a post-processing algorithm premised on edge displacement field-based classification was evaluated by Acar and co-workers as a means of improving polyp detection and decreasing the number of false positives found (*IEEE Transactions on Medical Imaging* 2004, 21(12), 1461-1467).

In 2002 Kiss et al. developed a dual surface normal and sphere fitting method for polyps detection (*European Radiology* 2002, 12(1), 77-81). A subsequent disclosure of a modified surface normal overlap method for the detection of colonic polyps and lung nodules was described by Paik et al. (*IEEE Transactions on Medical Imaging* 2004, 23(6), 661-675). The surface normal methods exploit the fact that normals on the colon surface intersect with neighbouring normals depending on the curvature features of the colon. The mantra of these surface normal methods is that polyps show a high incidence of surface normal intersection owing to their spherical nature.

A number of issued patents discuss the processes involved in segmenting virtual endoscopy images/digital medical images and detecting abnormal lesions and distortions in these images (see U.S. Pat. Nos. 5,133,020, 6,078,680, 6,366,800, 6,556,696, and 6,909,913). The subject matter of these patents is not directed to the development of a method for detecting flat polyps, which are particularly difficult to detect through existing CAD techniques.

US Patent Application Nos. 2005/0078858, 2005/0149286, 2005/0152588 all disclose methods for the detection of abnormal structures and growths in medical images. These three patent applications also place specific emphasis on the detection of polyps in the colon.

Existing CAD techniques primed for detecting raised polyps can also detect some flat polyps, however the sensitivity is low. The anisotropic characteristics of flat polyps make their detection more difficult. Features utilised in current methods for the detection of polyps are not well suited to identifying flat polyps. Manual examination of a CTC scan is an option, but again the detection rate of flat polyps is quite low. Thus, there is a necessity for a method that can robustly identify potential flat polyps whilst minimising the occurrence of false positives.

SUMMARY OF THE INVENTION

In one aspect the present invention provides for a method of formatting data for detecting flat polyps in a Computed Tomography Colonography, CTC, dataset comprising the steps of:
  i) extracting colon surface data, from the CTC dataset, within a sub-volume centered on a candidate polyp seed point;
  ii) identifying individual sets of points corresponding to the candidate polyp's body and the candidate polyp's base within that sub-volume;
  iii) re-formatting the candidate polyp by projecting selected points corresponding to the candidate polyp's on to a tangent plane;
  iv) generating a series of cutting planes based on the reformatted Candidate polyp.

Desirably, the step of re-formatting the candidate polyp by projecting selected points corresponding to the candidate polyp's on to a tangent plane comprises:
  i) projecting the set of points corresponding to the candidate polyp's body on to a tangent plane via a normal vector, wherein the normal vector is calculated from the best fitting plane to the set of points corresponding to the candidate polyp's base;
  ii) isolating a new seed point for the candidate polyp from the projected data; and iii) locating the nearest surface point to the new seed in the extracted dataset above, and region-growing the surface ab initio from this point;

Preferably, the step of generating a series of cutting planes based on the reformatted candidate polyp comprises:

i) identifying individual sets of points corresponding to the candidate polyp's body and the candidate polyp's base in the region-grown surface (see step iii) above), and determining the normal vector from the best fitting plane to the set of points corresponding to the candidate polyp's base;

ii) using the normal vector to slice the candidate structure in a number of different orientations; and iii) generating a series of planes for each orientation, wherein elliptical structures can be identified as representative of flat polyps.

In a further aspect, the present invention provides a method of formatting data for detecting flat polyps in a Computed Tomography Colonography, CTC, dataset comprising the steps of:

i) extracting colon surface data, from the CTC dataset, within a sub-volume centered on a candidate polyp seed point;

ii) identifying individual sets of points corresponding to the candidate polyp's body and the candidate polyp's base within that sub-volume;

iii) projecting the set of points corresponding to the candidate polyp's body on to a tangent plane via a normal vector, wherein the normal vector is calculated from the best fitting plane to the set of points corresponding to the candidate polyp's base;

iv) isolating a new seed point for the candidate polyp from the projected data;

v) locating the nearest surface point to the new seed in the extracted dataset above, and region-growing the surface ab initio from this point;

vi) identifying individual sets of points corresponding to the candidate polyp's body and the candidate polyp's base in the region-grown surface, and determining the normal vector from the best fitting plane to the set of points corresponding to the candidate polyp's base;

vii) using the normal vector determined in step vi) to slice the candidate structure in a number of different orientations; and viii) generating a series of planes for each orientation, from which elliptical structures can be identified as representative of flat polyps.

Preferably, candidate seed points are located utilising a 3D Hough transform.

In a preferred embodiment of the invention, the sub-volume is a cube of data of side 25 mm, centered on the seed point.

Preferably, a distance histogram technique is utilised to identify individual sets of surface voxels corresponding to the polyp candidate's body and the polyp candidate's base. The resultant histogram represents the distance of surface points to the seed. As used herein, the term "distance histogram technique" refers to a histogram calculated using the Euclidean distance between candidate seed points and colonic surface voxels. Preferably, only those points within the range of maximum allowed flatness to maximum allowed curvature are considered when plotting the distance histogram.

Preferably, the distance histogram technique comprises the steps of:

calculating a normal vector for every surface point (using a 3D Sobel filter);

determining the standard deviation of the normals in the 3×3×3 surface neighbourhood, wherein the standard deviation is used as a measure of local surface curvature (this is referred to as the normal disparity measure);

retaining only those points within the maximum allowed flatness to the maximum allowed curvature; and plotting a surface histogram of the number of surface voxels at any given distance from the initial seed point.

In a preferred embodiment, the voxels corresponding to the polyp candidate's body and the polyp candidate's base are determined by identifying the first significant maximum and its following next significant minimum from the zero-crossings of a differential of the histogram function.

Preferably, isolating the new seed point comprises the steps of:

labelling the non-flat surface of the candidate polyp's body using region-growing, wherein this process is seeded by the points which are also part of the polyp body;

projecting these labelled points onto a tangent plane, via the normal vector of the best fitting plane to the set of points corresponding to the candidate polyp's base;

applying least-square ellipse fitting to the data;

locating the centre of the best-fitting ellipse; and projecting this point, via the previously calculated normal vector, onto a plane passing through the 3D surface's centroid, wherein this point becomes the new seed for all further processing.

Preferably, the least-square error parameter associated with the least-square ellipse fitting to the data includes a normalisation factor to account for the scale effect of the radius of the ellipse at a given angle from the centre of the ellipse. A low calculated least-square error is indicative of a candidate flat polyp.

Preferably, the step of locating the nearest surface point to the new seed in the extracted dataset and region-growing the surface ab initio from this point is based on a geodesic distance metric.

Ideally, region-growing is done on every point whose normal disparity measure (vide supra) is lower than a maximum allowed convexity. The normal disparity measure is determined by calculating a normal vector for every surface point and determining the standard deviation of the normals in the 3×3×3 surface neighbourhood, wherein the standard deviation is used as a measure of local surface curvature (this is also referred to as a normal disparity measure).

Preferably, sets of points corresponding to the candidate polyp's body and the candidate polyp's base in the region-grown surface are identified using a distance histogram technique. The distance histogram technique preferably uses a distance metric comprising the sum of the distance to the seed plus a fraction of the point's geodesic distance. The point's geodesic distance is equivalent to its generation number in the region-growing process.

In a preferred embodiment, only non-flat surface voxels are considered.

The voxels corresponding to the polyp candidate's body and the polyp candidate's base may be determined by identifying the first significant maximum and its following next significant minimum from the zero-crossings of a differential of the histogram function.

In a preferred embodiment, the candidate structure is sliced in seven different orientations using the normal vector calculated from the best fitting plane to the set of points corresponding to candidate polyp's base. Preferably, the candidate structure is sliced in seven different orientations based on the orientation of the normal vector and two sets of three orientations at two different angles from the normal vector. A normal plane and a tangent plane may then be extracted for each different orientation. The surface, volume, and plane normals are then preferably rotated so that the candidate polyp has a horizontal orientation. A tightest bounding box may then be fitted to the data, and the working volume for the data may be extracted from this sub-volume. The data may then be padded to get square images.

The method of the invention may optionally comprise an edge detection step, wherein edge detection may be performed on each of the planes extracted. The edges representing the candidate polyp may be detected using a canny filter. Preferably, only the three strongest connected edges are kept. Edge linking may be performed between the two strongest edges, and only the two strongest edges may be retained following edge linking As will be appreciated by a person skilled in the art, edge strength is defined as the magnitude of the local greyscale gradient vector at the corresponding location in the original grey data.

Once data has been formatted in accordance with the above method, the data can be used in the subsequent classification of polyps, as also provided by the present invention. Preferably, classification is by means of a classification committee. There may be one classifier for each plane from the three orientation types. Each classifier preferably casts an individual vote on the class of polyp the plane belongs to, e.g. flat, round, or fold. Preferably, the final classification decision is based on the results of the individual classifiers. The features utilised in classification may be extracted from the individual planes.

Preferably, the features utilised in classification may comprise at least one of:

applying least squares fitting to the strongest edge in the plane to find the best fitting line, circle and ellipse;

calculating the angle between the two best fitting lines on the two edges to identify folds;

determining the tissue pixels content of the ellipse; calculating the mean and variance of the tissue values, and calculating the third order moment invariants from a processed edge Preferably, when applying least squares fitting, the fitting error for the line and circle are kept as features as well as the ellipse dimensions, ratio, and the ellipse error as described above.

The invention further provides a processing apparatus for performing the above method of data formatting and classification, The invention further provides a computer readable medium or software having instructions which, when executed by a processor, perform the above method of data formatting and classification. See FIG. 6 showing a block diagram of a processor and computer readable medium.

It will be appreciated that such software may be integrated into new or existing CAD-CTC tools to provide a fully automated tool for the detection of flat polyps in CTC data.

It will be appreciated that the present invention provides an automated image analysis based approach to the problems previously associated with the detection of flat polyps in CTC data. These problems include the extreme difficulty in detecting, manually or automatically, flat polyps in both CT colonography and optical colonoscopy. There are no existing automated solutions to the flat polyp detection problem. Existing automated systems for detecting raised polyps will also detect flat polyps, the sensitivity is very low. Manual examinations via optical colonoscopy or CT Colonography can sometimes detect flat polyps but the detection rate is low. The present invention provides an automated alternative to unaided manual detection. The solution provided by the present invention addresses difficult technical challenges involved in the robust identification of non-obvious features in the data.

BRIEF DESCRIPTION OF THE DRAWINGS

Embodiments of the invention will be described, by way of example only, with reference to the accompanying drawings in which.

DETAILED DESCRIPTION OF THE DRAWINGS

Figure 5:
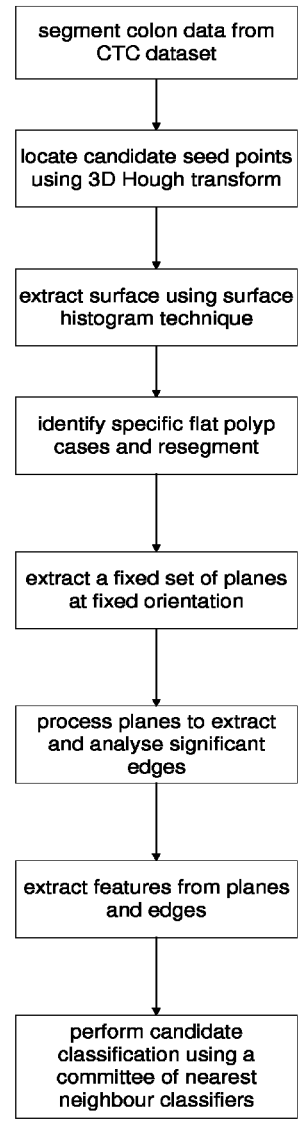
FIG. 5 is a flow chart representing the method of the present invention.
Figure 6:
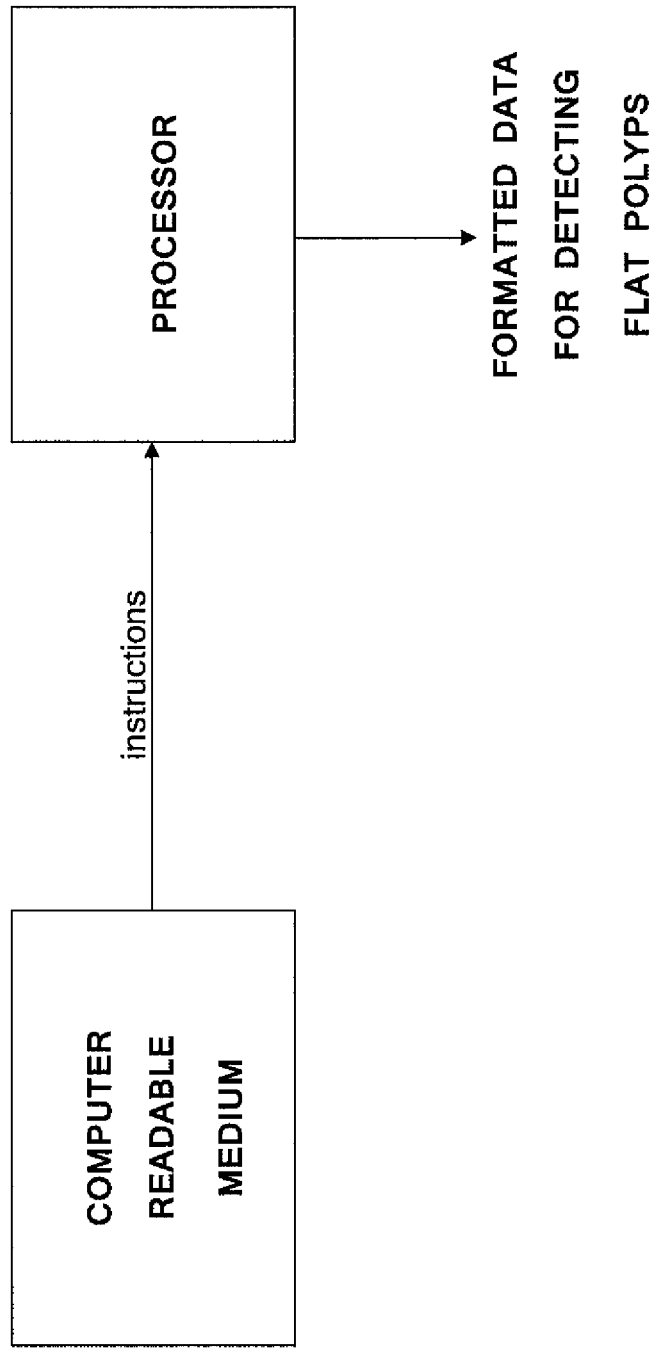
FIG. 6 is a block diagram illustrating a processor that executes instructions from a computer readable medium to perform data formatting and classification according to the present invention.

This method for detecting flat polyps in a Computed Tomography Colonography (CTC) dataset is represented in the flowchart of FIG. 5. The method comprises the initial steps of segmenting the data for the colon from the rest of the data in the CTC dataset, and locating candidate polyp seed points utilising a 3D Hough transform based approach. Each candidate polyp seed point represents a higher than normal concentration of surface normal intersections; in general, more than one seed is generated for any given flat polyp, which aids in detection. The original data is composed of non-isometric voxels, typically exhibiting an inter-slice resolution of approximately half the in-slice resolution. The later steps of the method are centered on feature extraction from planes of custom orientations, thus it is necessary for the data to be rendered isotropic. This is achieved by interpolating the data set on a seed by seed approach. Interpolating the entire data set would not be computationally efficient.

Voxels corresponding to colon surface data are extracted within a small sub volume surrounding a given seed point from the dataset. The size of the volume extracted depends in the dataset resolution—typically it is calculated to represent a cube of data of side 25 mm, centered on the seed point. The colon surface is detected by extracting tissue voxels in the neighbourhood of air voxels. This gives a set of points representing the different colon wall surface sections present in the volume. The local structure that generated the original seed point is identified using a distance histogram technique.

Figure 1:
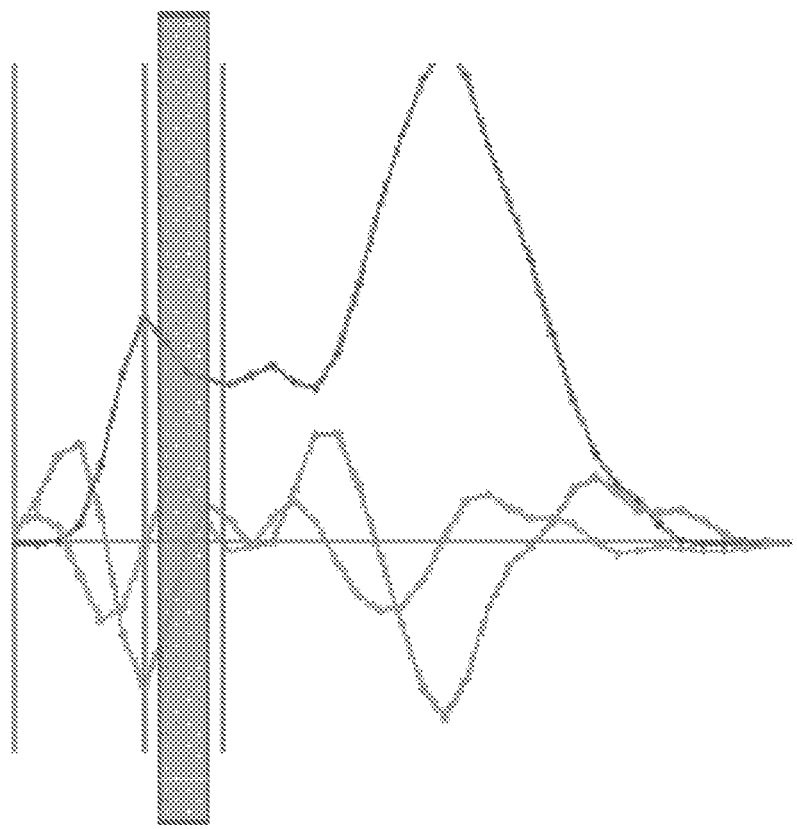
FIG. 1 is a distance histogram plot of a section of colon surface data extracted with a cube of data of side 25 mm, centered on a seed point.

FIG. 1 shows a distance histogram plot of a section of colon surface data extracted within a cube of data of side 25 mm, centered on the seed point. The histogram represents the distance of surface points to the seed. In order to reduce the complexity in the histogram the amount of data used to build it is minimised—points corresponding to flat areas are not utilised, as they are not relevant. Similarly, points featuring very sharp local curvature are characteristic of fold ridges and are discarded as well.

The steps involved in processing the surface points for the distance histogram technique comprise:
i) calculating a normal vector for every surface point using a 3D Sobel filter,
ii) determining the standard deviation of the normals in the 3×3×3 surface neighbourhood, wherein the standard deviation is used as a measure of normal dispersion, which is an indication of local surface curvature,
iii) retaining only those points within the maximum allowed flatness to the maximum allowed curvature, and
iv) plotting the surface histogram of the number of surface voxels at any given distance from the initial seed point.

Identifying the polyp candidate's body and the polyp candidate's base is achieved by ascertaining the first significant maximum and its following next significant minimum. Since the feature is not always a robustly formed peak, a simple analysis of the first derivative is not enough. The peak maximum and the peak end (the following minimum) are best calculated from the smoothed third derivative. In FIG. 1 a distance histogram of the original data, the second derivative, and the third derivative is shown—the first derivative has been omitted for clarity. The two points of interest in the third derivative are the zero-crossing corresponding first vertical line in the histogram, and the zero-crossing corresponding to second vertical line in the histogram. Those points to the left of the first vertical line correspond to the body of the polyp candidate, whereas the points situated between the two vertical lines, i.e. the region shaded in FIG. 1, represents the candidate's border ridge and part of the surrounding surface. As the polyp segmentation technique discussed above was based purely on distance, other surface voxels will be present in the set of points representing the polyp candidate's body. To compensate for this, the set of points corresponding to the polyp candidate's body are labelled and only the most relevant set of connected points are kept. This set is chosen based on its content of non-flat surface points as described earlier.

Using least-square fitting, a plane is fitted to the set of points representing the polyp base. The best fitting plane gives the candidate structure's orientation and the normal vector is calculated from the fitting parameters.

The histogram method described above is efficient in locating sessile and small flat polyps, but can fail to operate robustly for extended flat polyps. In the case of the latter, only a small section of the edge is segmented. To complete data reformatting and enable more complete segmentation of polyp candidates the data is further processed. The steps involved in this further processing comprise:
i) labelling the non-flat surface using region-growing; this is seeded by the points which are also part of the polyp body,
ii) the labelled points are projected onto a tangent plane, via the normal vector as of the best fitting plane,
iii) applying least-square ellipse fitting to the data,
iv) locating the centre of the best fitting ellipse,
v) projecting this point, via the previously calculated normal vector, onto a plane passing through the 3D surface's centroid; wherein this point becomes the new seed for all further processing.

Figure 2:
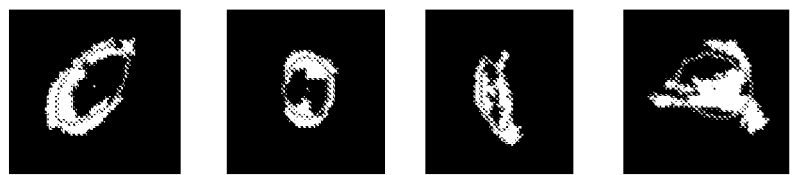
FIG. 2 is an representation of the non-flat surface points projected onto a tangent plane with best fit ellipses overlayed, for a flat polyp, a raised polyp, and two folds.

Projected non-flat surface points, with best fit ellipses overlayed, for a flat polyp, a raised polyp, and two folds are given in FIG. 2. The purpose of projecting the data onto a tangent plane is to identify the signature of large flat polyps. One of the characteristics of the non-flat surface set of points is that only the ridge of flat polyps is registered on the tangent plane. Since their bodies are flat they are not part of the set, similarly the surrounding colon wall is missing as well. Hence, the method must be able to identify elliptical lines in the projected plane. Round polyps are projected as full circle-like figures and folds or other structures as wide complex unstructured shapes. The data in the projected plane is represented as a binary image as can be seen in FIG. 2. Any small holes in the projected data are filled in to aid identification.

Figure 3:
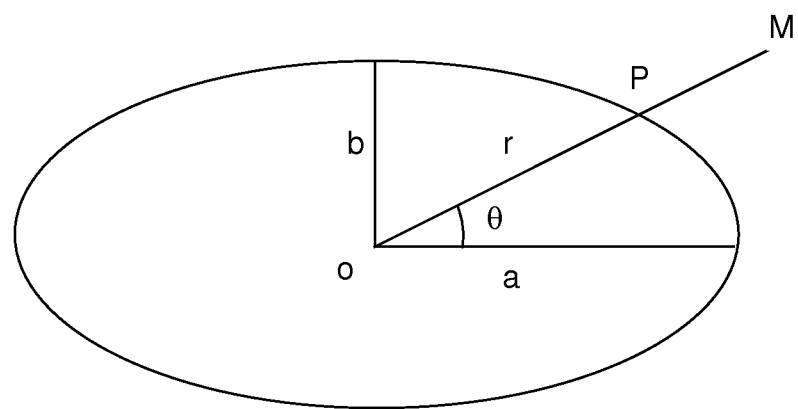
FIG. 3 is an illustration of an ellipse utilized to formulate the modified error for the least-square ellipse fitting.

In order for the least-square ellipse fitting to the projected data on the tangent plane to be reliable, modification of the least-square error term ($\delta$) as shown in equation (1) and FIG. 3 was necessary.

$$\delta = \frac{(OM - r)^2}{r} \quad \text{error} \tag{1}$$

$$r = a\sqrt{\frac{1 - e^2}{1 - e^2\cos^2\theta}} \quad \text{radius}$$

$$e = \sqrt{1 - \frac{b^2}{a^2}} \quad \text{eccentricity}$$

Wherein;
a is the longest chord from the centre (o) to the circumference,
b is the shortest chord from the centre to the circumference,
OM is the distance from the origin to the point M
$\theta$ is the angle from the chord a to the point M For every fitted point, the method calculates the ideal point located on the ellipse at the same angle. In order to make the error term insensitive to scale effect, the radius of the ellipse at this angle (defined as the distance between a point on the ellipse and it's centre) is used as a normalisation factor in the calculation. The contribution to the error of every fitted point is the square of the distance between fitted and ideal points divided by the radius. This metric allows for a small band of error surrounding the ellipse line and increases quickly when the point is outside this band, both inside and outside the ellipse. For a low calculated error the projected data is considered to be a flat polyp.

Where the candidate is considered to be a flat polyp, this data is further processed. A new seed, which better represents the polyp's centre, is calculated from the fitted ellipse centre. The fitted ellipse centre is projected, via the previously calculated normal direction, onto a plane passing through the 3D surface's centroid. This point becomes the new seed for all further processing.

The colon surface data is region-grown from this new seed point. A geodesic distance is calculated from each of the points of the original colon wall surface to the new seed point. The closest surface point to the new seed is determined. From this point the surface is region-grown. Region growing is done on every point whose normal disparity measure is lower than the maximum allowed convexity. For each point added its generation number becomes its geodesic distance.

Once the data reformatting steps above have been completed, for example in the case of a candidate flat polyp, the seed has changed and the candidate has to be segmented again. The distance histogram processing technique is applied once again (vide supra) to re-segment the data. Re-segmenting comprises the steps of:
i) constructing a distance histogram for the candidate, wherein the distance metric used is defined to be the sum of the distance to the seed plus a fraction of the point's geodesic distance. Only non-flat surface points or voxels are considered.
ii) calculating the zero-crossings from the smoothed first derivative. Determination of the polyp body and polyp base from the maximum and next minimum values of the smoothed first derivative (vide supra).

Using least-square fitting, a plane is fitted to the set of points representing the polyp base. The best fitting plane gives the candidate structure's orientation and the normal vector is calculated from the fitting parameters. The centroid of the polyp candidate is determined and this becomes the new seed.

Once re-segmentation has been completed, the candidate is further processed and the working volume for feature calculation must be determined. The candidate is sliced into seven orientations based on the orientation of the normal vector (calculated from the best-fitting plane to the set of points representing the polyp base) and two sets of three orientations at two different angles from the normal. A normal plane and a tangent plane are subsequently extracted for each orientation and a plane normal is computed for each of the planes extracted giving a total of 14 plane normals.

The surface, volume, and plane normals are then rotated so that the candidate has a horizontal orientation and the tightest bounding box is calculated for the candidate polyp. The sub-volume from the bounding box is subsequently extracted. This sub-volume becomes the working volume and contains only relevant data.

Each plane within the working volume is subsequently analysed to calculate a set of features. The data is padded to get square images. In the case where the data on the planes is not representative of perfect geometric shapes, the data may be optionally subjected to edge detection so as to obtain a reasonable structure for analysis in subsequent feature extraction steps. Edge detection comprises:
  i) extracting the edges representing the candidate polyp from the image—this is achieved by applying a canny filter. The result is represented as a binary edge image, indicating edge and non-edge voxels. Any edges created due to padding during plane extraction are removed.
  ii) the three strongest connected edges are kept—edge linking is performed between the two strongest edges. The edges' ends are located using a morphological approach. Once edge linking is complete, only the two strongest edges are retained.

For maximum robustness, in the case that no significant edges are found in the plane a canny filter with more aggressive parameters is applied and if this does not succeed the plane is enlarged and the process repeated until an edge is found or a set limit is reached.

Figure 4:
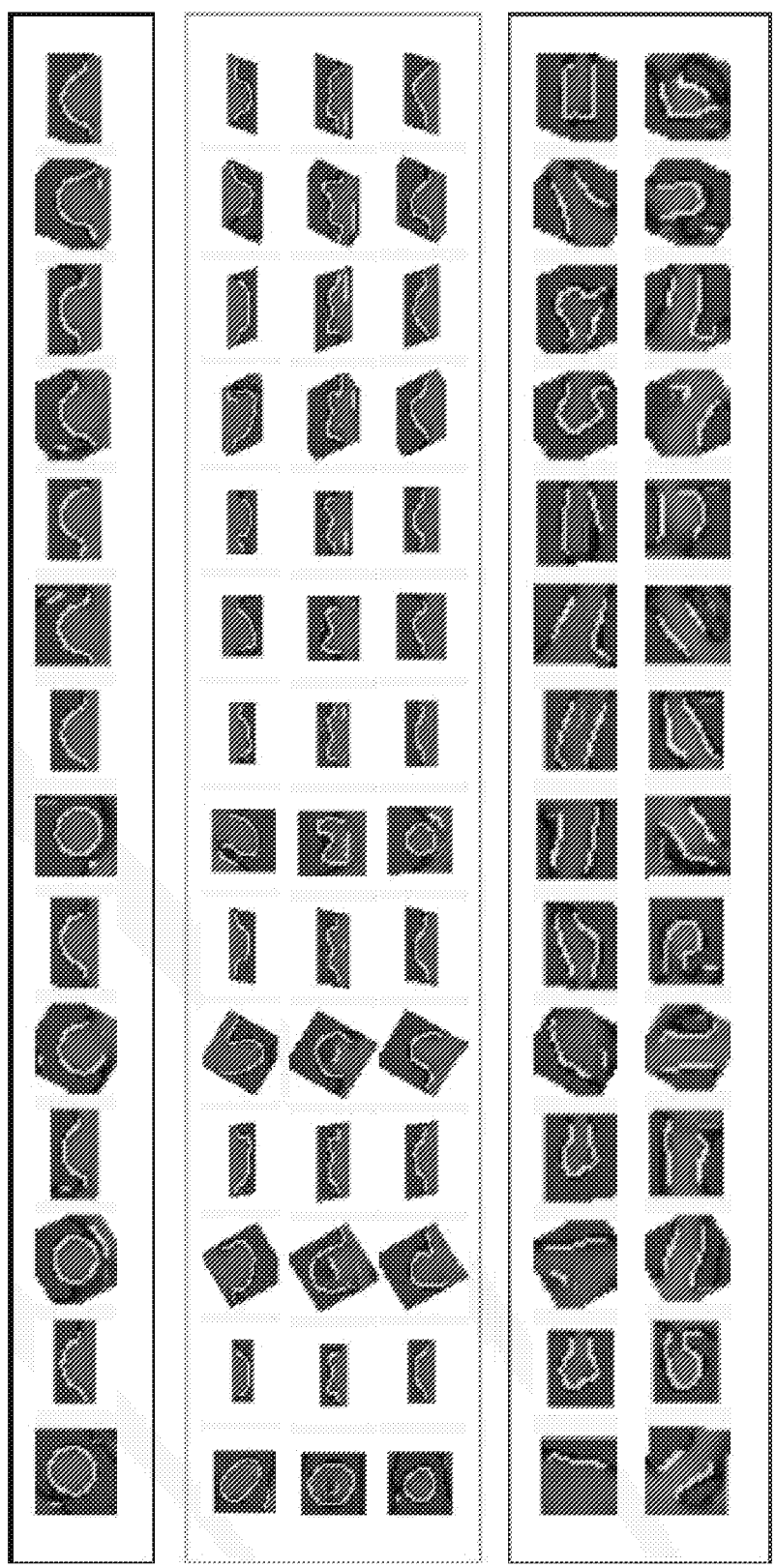
FIG. 4 illustrates fourteen extracted slicing planes of six candidate polyp structures—The first row have been extracted from a raised polyp. The next three rows come from three flat polyps, and the final two rows represent candidates, which were in fact folds.

FIG. 4 illustrates the fourteen extracted planes, subjected to edge detection, for six separate candidates. The first row corresponds to a raised polyp. The next three rows show planes extracted from a flat polyps. The extracted planes in the final two rows are representative of folds.

Polyp classification is by means of a classification committee. For each polyp candidate the method extracts a number of features from the fourteen planes. The seven orientations guiding plane extraction can be represented in three categories: the normal orientation and the two different elevations, which means that the method has built-in redundancy. This redundancy was introduced to make the classification resistant to feature failure in some planes, as well as to improve recognition of irregular polyps and folds. Additionally, if the features from a particular plane are deemed unfit for classification they are not passed on to the classifier.

The features utilised in classification are calculated from the strongest edge previously found. The classification system includes at least one step selected from:
  Applying least squares fitting to the strongest edge to find the best fitting line, circle and ellipse. The fitting error for the line and circle are kept as features as well as the ellipse dimensions, ratio, and the ellipse error as described above;
  Calculating the angle between the two best fitting lines on the two edges to identify folds;
  Determining the tissue pixels content of the ellipse;
  Calculating the mean and variance of the tissue values;
  Calculating the third order moment invariants from a processed edge, i.e. the strongest edge is processed so that it becomes a single curve (all additional branches are trimmed). This is achieved by tracking each of the edge's ends until a fork is found. For every fork, the shortest branch is then trimmed.

All the features used for classification are by nature or artificially made scale independent.

The classification works as a committee of classifiers. There is one classifier for each plane from the three orientation types. This means six classifiers since each orientation leads to the extraction of two orthogonal planes (normal and tangent). Each classifier casts an individual vote on the class the plane belongs to (flat, round, fold). The final decision is taken based on the result of the individual classifications. This approach allows the individual classifier to use different subsets of the feature space. This reduces the number of features used and allows them to be used only in relevant situations.

EXAMPLES

The operation of the technique has been validated on a database of CTC scans from a number of sources, containing manually flagged real flat lesions, artificial phantom data, and synthetic polyps, artificially generated and digitally inserted into the datasets, designed to mimic the characteristics of the real lesions. This use of synthetic polyps is necessary due to the small number of real polyps which have been flagged in the test databases of CTC scans. This situation is unsurprising in light of the fact that flat lesions are currently so difficult to detect.

The detection results presented in Table 1 illustrate the effectiveness of the procedure in identifying flat lesions. The results shown are for a series of tests conducted using CT scans of a custom phantom, designed to accurately mimic the appearance and characteristics of a real CTC examination. In this way it is possible to conduct many tests without any exposure of subjects to the ionising radiation associated with taking an x-ray CT scan.

TABLE 1

Polyp detection results for synthetic data (VSG phantom)

| Polyp size (mm) | Number | Sensitivity |
|---|---|---|
| ≥10 | 15 | 93.3 |
| 5 to 10 | 12 | 100 |
| <5 | 11 | 100 |
| Flat | 19 | 100 |
| Flat + Depressed | 22 | 86.3 |
| All Sizes | 60 | 93.3 |

The invention is not limited to the embodiments hereinbefore described but may be varied in both construction and detail.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A method of formatting data for detecting colon polyps in a Computed Tomography Colonography (CTC) dataset using a computer processing apparatus for providing automated image analysis, said method comprising the steps of:
   i) using the computer processing apparatus to receive the CTC dataset and using the computer processing apparatus to extract colon surface data, from the CTC dataset, within a sub-volume of the extracted colon surface data that is centered on a seed point of a candidate polyp;
   ii) using the computer processing apparatus to identify individual sets of points corresponding to a body of the candidate polyp and a base of the candidate polyp within the sub-volume;
   iii) using the computer processing apparatus to select the points corresponding to the body;
   iv) using the computer processing apparatus to re-format the candidate polyp by projecting the selected points corresponding to the body on to a tangent plane, wherein re-formatting of the candidate polyp includes the following steps carried out by the computer processing apparatus:
      (a) projecting the set of points corresponding to the body on to the tangent plane via a normal vector, wherein the normal vector is calculated from a best fitting plane to the set of points corresponding to the base,
      (b) isolating a new seed point for the candidate polyp from the projected data, wherein isolation of the new seed point comprises the following steps carried out by the computer processing apparatus:
         1) labelling the non-flat surface of the body using region-growing,
            wherein this process is seeded by the points which are also part of the body,
         2) projecting these labelled points onto the tangent plane, via the normal vector of the best fitting plane to the set of points corresponding to the base,
         3) applying least-square ellipse fitting to the data,
         4) locating the center of a best-fitting ellipse, and
         5) projecting this point, via the previously calculated normal vector, onto a plane passing through a centroid of a 3D surface,
            wherein this point becomes a new seed for all further processing, and
      (c) locating a nearest surface point to the new seed in the extracted colon surface data, and region-growing the surface ab initio from the nearest surface point; and
   v) using the computer processing apparatus to generate a series of cutting planes based on the reformatted candidate polyp.

2. A method according to claim 1 wherein the step of using the computer processing apparatus to generate a series of cutting planes based on the reformatted candidate polyp comprises the following steps carried out by the computer processing apparatus:
   i) identifying individual sets of points corresponding to the body and the base in the region-grown surface, and determining the normal vector from the best fitting plane to the set of points corresponding to the base;
   ii) using the normal vector to slice a structure of the candidate polyp in a number of different orientations; and
   iii) generating a series of planes for each orientation, wherein elliptical structures can be identified as representative of flat polyps.

3. The method of claim 1 wherein candidate polyp seed points are located in the CTC dataset utilising a 3D Hough transform.

4. The method of claim 1 wherein region-growing is done on every point whose normal disparity measure is lower than a maximum allowed convexity,
   wherein calculating the normal disparity measure for a point comprises calculating a normal vector for the point and determining a standard deviation of normals in the 3×3×3 surface neighbourhood, wherein the standard deviation is used as a measure of local surface curvature.

5. The method of claim 2 wherein the structure of the candidate polyp is sliced in seven different orientations using the normal vector calculated from the best fitting plane to the set of points corresponding to the base.

6. The method of claim 5 wherein the structure of the candidate polyp is sliced in seven different orientations based on orientation of the normal vector and two sets of three orientations at two different angles from the normal vector.

7. The method of claim 2 comprising an edge detection step.

8. The method of claim 7 wherein the edge detection step is performed on each of the planes extracted.

9. The method of claim 8 wherein edges representing the candidate polyp are detected in the edge detection step using a canny filter.

10. The method of claim 1, wherein the method further comprises:
    using the computer processing apparatus to classify candidate polyps using re-formatted candidate polyps.

11. The method of claim 10 wherein the step of classifying candidate polyps is performed by means of a committee of classifiers running on the computer processing apparatus.

12. The method of claim 6 wherein a normal plane and a tangent plane are extracted for each different orientation.

13. The method of claim 11 wherein the committee of classifiers comprises one classifier for each cutting plane.

14. The method of claim 12 wherein the method further comprises:
    fitting a tightest bounding box to the colon surface data to extract a sub-volume of the colon surface data, and
    extracting a working volume of the colon surface data from the sub-volume of colon surface data.

15. The method of claim 14 wherein the colon surface data of the extracted working volume is padded to get square images.

* * * * *